(12) United States Patent
Ramanathan et al.

(10) Patent No.: US 9,874,995 B2
(45) Date of Patent: Jan. 23, 2018

(54) MAINTAINING CONTEXT FOR MAXIMIZE INTERACTIONS ON GRID-BASED VISUALIZATIONS

(71) Applicant: Oracle International Corporation, Redwood Shores, CA (US)

(72) Inventors: Jairam Ramanathan, Waltham, MA (US); Prashant Singh, Lexington, MA (US); Hugh Zhang, Winchester, MA (US); Mark Robertson, San Diego, CA (US)

(73) Assignee: Oracle International Corporation, Redwood Shores, CA (US)

( * ) Notice: Subject to any disclaimer, the term of this patent is extended or adjusted under 35 U.S.C. 154(b) by 359 days.

(21) Appl. No.: 14/528,629

(22) Filed: Oct. 30, 2014

(65) Prior Publication Data
US 2015/0378555 A1 Dec. 31, 2015

Related U.S. Application Data

(60) Provisional application No. 62/017,213, filed on Jun. 25, 2014.

(51) Int. Cl.
| | |
|---|---|
| G06F 3/00 | (2006.01) |
| G06F 3/0481 | (2013.01) |
| G06F 17/30 | (2006.01) |
| G06F 3/0484 | (2013.01) |
| G06Q 10/00 | (2012.01) |
| G06F 3/01 | (2006.01) |

(52) U.S. Cl.
CPC ........ *G06F 3/04817* (2013.01); *G06F 3/0481* (2013.01); *G06F 3/04842* (2013.01); *G06F 3/04845* (2013.01); *G06F 17/30572* (2013.01); *G06Q 10/00* (2013.01); *G06F 2203/04803* (2013.01); *G06F 2203/04806* (2013.01)

(58) Field of Classification Search
None
See application file for complete search history.

(56) References Cited

U.S. PATENT DOCUMENTS

| | | | |
|---|---|---|---|
| 2007/0061732 A1* | 3/2007 | Bobbin | G06F 3/04817 715/739 |
| 2007/0118809 A1* | 5/2007 | Ozugur | H04L 63/102 715/776 |

(Continued)

*Primary Examiner* — Toan Vu
(74) *Attorney, Agent, or Firm* — Trellis IP Law Group, PC

(57) ABSTRACT

A grid-based visualization displays icons representing data entities in grid cells corresponding with the data entities' attribute values. The grid-based visualization enables users to zoom in or maximize the size of a selected grid cell, row of grid cells, column of grid cells, or any other selection of grid cells in a grid-based visualization. When zooming on a single row, the other rows are reduced in height and the selected row is enlarged to occupy the remaining space. When maximizing a single column, the other columns are reduced in width and the selected column is enlarged. When maximizing one or more cells, the unselected cells are minimized in height and/or width, and the selected cells are enlarged. Icons may be dynamically sized to fit within their assigned cells. An overflow indicator, zooming, and scrolling may be used to view sets of icons that cannot fit within their assigned cells.

11 Claims, 12 Drawing Sheets

(56) References Cited

U.S. PATENT DOCUMENTS

| | | | |
|---|---|---|---|
| 2007/0297643 A1* | 12/2007 | Uehori | G06F 17/211 382/100 |
| 2008/0282289 A1* | 11/2008 | Drazin | H04N 5/44543 725/40 |
| 2010/0077338 A1* | 3/2010 | Matthews | G06F 3/0481 715/779 |
| 2011/0107265 A1* | 5/2011 | Buchanan | G06Q 30/02 715/835 |
| 2012/0185800 A1* | 7/2012 | Hart | G06F 3/04817 715/810 |
| 2013/0268837 A1* | 10/2013 | Braithwaite | G06F 9/4443 715/234 |
| 2014/0026099 A1* | 1/2014 | Andersson Reimer | G06F 3/04883 715/825 |
| 2014/0331181 A1* | 11/2014 | Hildreth | G06F 3/011 715/821 |
| 2015/0082251 A1* | 3/2015 | Lam | G06F 17/30876 715/843 |
| 2015/0212693 A1* | 7/2015 | Qi | G06F 3/0482 715/765 |
| 2016/0202866 A1* | 7/2016 | Zambetti | G06F 3/0485 715/835 |

* cited by examiner

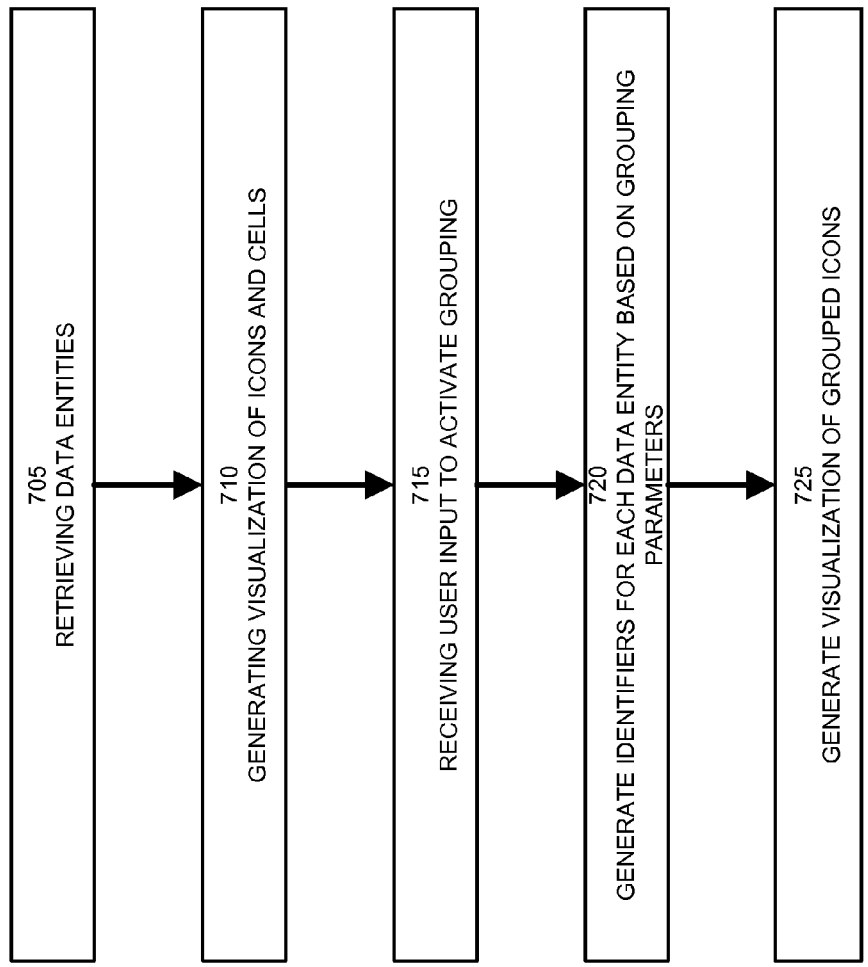

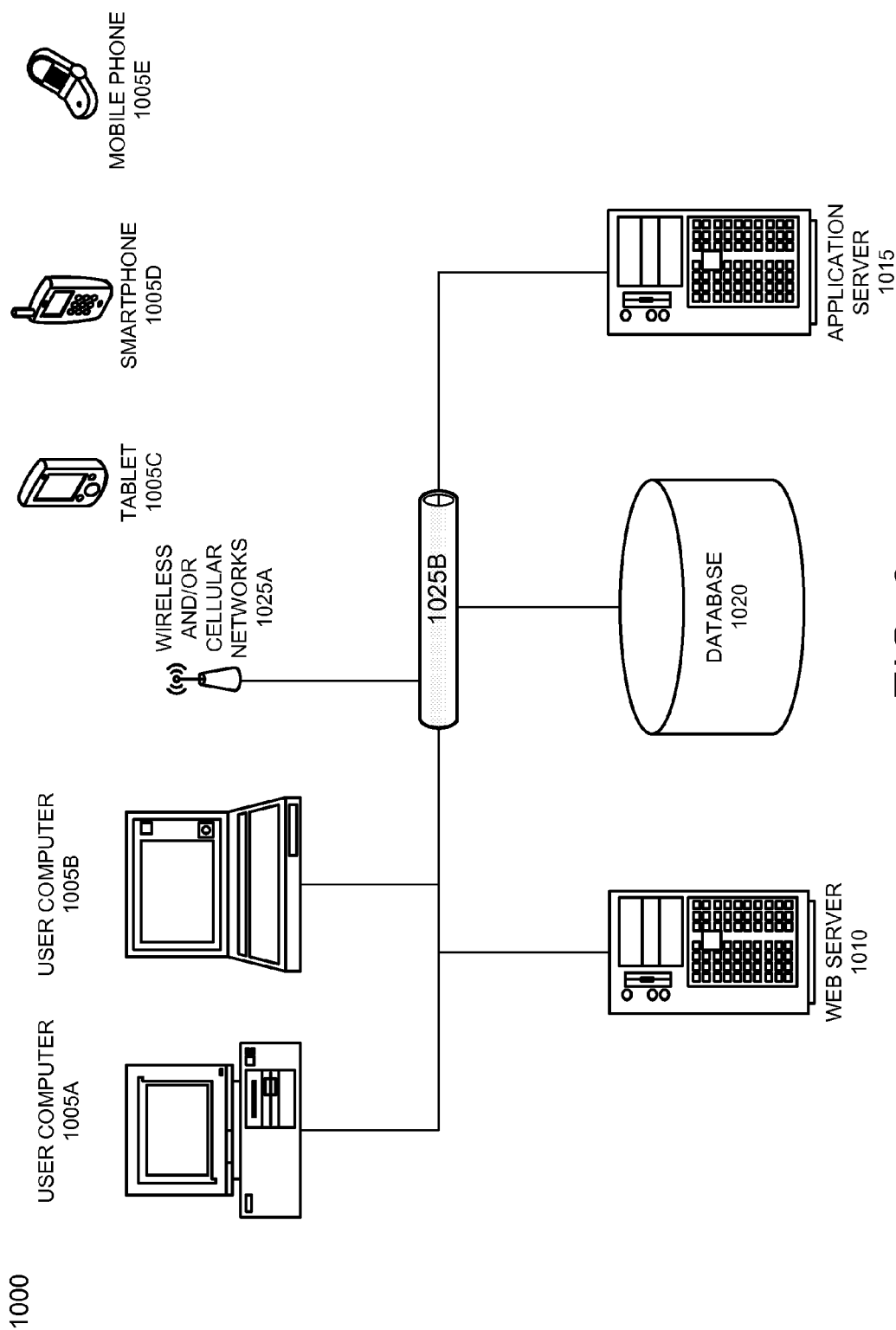

MAINTAINING CONTEXT FOR MAXIMIZE INTERACTIONS ON GRID-BASED VISUALIZATIONS

CROSS REFERENCES TO RELATED APPLICATIONS

This application claims priority from U.S. Provisional Patent Application Ser. No. 62/017,213, entitled MAINTAINING CONTEXT FOR MAXIMIZE INTERACTIONS ON GRID-BASED VISUALIZATIONS, filed on Jun. 25, 2014, which is hereby incorporated by reference as if set forth in full in this application for all purposes.

This application is related to U.S. patent application Ser. No. 14/528,884, entitled DYNAMIC NODE GROUPING IN GRID-BASED VISUALIZATIONS, filed on Oct. 30, 2014, which is hereby incorporated by reference, as if set forth in full in this specification.

BACKGROUND

This invention relates to the field of user interfaces for visualizing, interacting with, and creating or modifying data. Grid-based views are often used to display information across two dimensions represented by grid cells arranged into one or more rows and columns. Grid-based views may include any number of grid cells in any M row by N column arrangement, where M and N are arbitrary positive integers. Each grid cell may include zero, one, or more icons, text entities, numbers, images, symbols, or other visual information, referred to generally herein as icons. Icons are generally displayed in grid cells to indicate relationships between corresponding items of data and the attributes associated with the grid's dimensions.

For example, a grid-based view might display icons representing employees in a company with one dimension representing employee ability and the other representing employee performance. Each cell in this example grid-based view represents a different combination of employee ability and performance values, and each cell contains icons representing the employees having ability and performance values associated with that cell.

One problem with grid-based visualizations is that the cells in grid-based visualizations often contain more icons than can be displayed in a space-constrained visualization. In space constrained scenarios, the amount of space allotted to an individual row, column, or cell may limit the amount of information that can be display for that particular section of the grid. The most common approach to this problem is to simply zoom the entire grid within a scrollable region, allowing the user to view more details about the section of the grid that is currently within the scrolled viewport. However, zooming into a portion of a grid makes it difficult for users to perceive the relationship between the enlarged portion of the grid with respect to the whole grid.

To address this issue of providing context, prior approaches may utilize an overview window that displays a diagram of the current zoomed view in relation to the whole view. However, even with an overview window, areas outside of the scrolled viewport are completely missing from view; all of the associated information is hidden from the user; and the user is unable to interact with these areas without scrolling them into view.

Another problem arising with space-constrained visualizations is that it is often not possible to display all of the icons placed in a grid cell or other collection or grouping at once in the space allotted for the grid cell. Prior visualizations have not been able to elegantly handle the "overflow" of icons for each cell and provide users access to their contents.

Prior visualizations often have two problems: inelegant ways to alert the user that an overflow of icons has occurred and visualizations and interfaces to the overflowed icons that are often not well integrated into the base visualization. An example of the former is simply relying on a label indicating the total count of icons within a cell and relying on the user to notice that the number of rendered icons is fewer than this number. Even a label that more explicitly indicates that a subset of icons is being rendered has the shortcoming that users often treat labels as secondary indicators in visual components. An example of the latter problem is typically directing the user to a completely separate view (e.g. a scrollable table) that contains the full set of icons, that may take the user out of context.

Even in cases where all of the icons do fit inside the on-screen space of their grid cell, it is sometimes desirable to group these individual icons into summary or group icons to provide the end user with useful aggregate information about their data.

Prior approaches to this problem typically have a few drawbacks. It is very common for the grouping to be built in to the component by the visualization designer. This is useful for giving the end user an initial summary view, but is also limiting because the end user has no control over the grouping criteria. If the user is given any control over the grouping, this is often done via controls outside of the visualization, which can be disorienting for the user. Lastly, there may not be any access to the individual icons that comprise the summary icon, except in a separate detail view, which again takes the user out of context.

Therefore, there is an unmet need for improvements to grid-based visualizations to view the icons in grid cells in detail; handling overflow when there are more icons in a grid cell than can be displayed in the allocated on-screen space; and grouping icons in grid cells to provide users with useful aggregate information.

SUMMARY

Embodiments of the invention may zoom in or maximize the size of a selected grid cell, row of grid cells, column of grid cells, or any other selection of grid cells in a grid-based visualization. When maximizing a single row within the grid, column widths may remain unchanged. In an embodiment, the heights of the cells in the rows above and below the maximized row may be reduced to the minimum height needed to accommodate any labeling of the grid cells. The heights of the cells in the maximized row are increased to occupy the remaining space allocated to the visualization.

When maximizing a single column within the grid, row heights may remain unchanged. In an embodiment, the widths of the cells in the columns before and after the maximized column are reduced to the minimum width needed to accommodate any labeling of the grid cells. In a further embodiment, cell labels may be rotated 90 degrees to more efficiently use the horizontal space. The widths of the cells in the maximized columns are increased to occupy the remaining space allocated to the visualization.

When maximizing a single cell or subset of cells within the grid, an embodiment of the invention combines the row and column examples. All rows above and below the subset are vertically minimized and the remaining vertical space is evenly distributed among the remaining rows. Similarly all columns in the non-minimized rows before and after the subset are horizontally minimized and the remaining horizontal space is evenly distributed among the subset cells.

Embodiments of the invention may use several approaches, alone or in combination, to address the problems of overflow. A first approach attempts to minimize the occurrence of overflow by dynamically fitting as many nodes as possible within a cell.

Even allowing for optimal node sizing, there may still be too many nodes to fit into a space-constrained cell. For this case, a further approach uses a graphical overflow indicator (e.g. an image of an ellipsis). In an embodiment, this indicator is given the same prominence in the cell layout as the nodes themselves, making it obvious to the users that overflow has occurred.

Still another approach uses the zooming or maximize interaction, as described above, to allow the user full affordance to the overflowed nodes. In an embodiment, the user can maximize any cell in the grid, include grid cells having node overflow, allowing more of that cell's nodes to be displayed. When maximized, an additional embodiment enable a scrolling control on that cell, which allows the user to access all of the nodes contained by that cell regardless of how many nodes there are.

A further understanding of the nature and the advantages of particular embodiments disclosed herein may be realized by reference of the remaining portions of the specification and the attached drawings.

BRIEF DESCRIPTION OF THE DRAWINGS

The invention will be described with reference to the drawings, in which:

FIG. 7 illustrates a method of grouping icons according to one or more attributes in a grid-based visualization according to an embodiment of the invention; and FIG. 8 illustrates a computer system suitable for implementing embodiments of the invention.

In the drawings, identical reference numbers indicate identical elements.

DETAILED DESCRIPTION OF EMBODIMENTS

Figure 1:
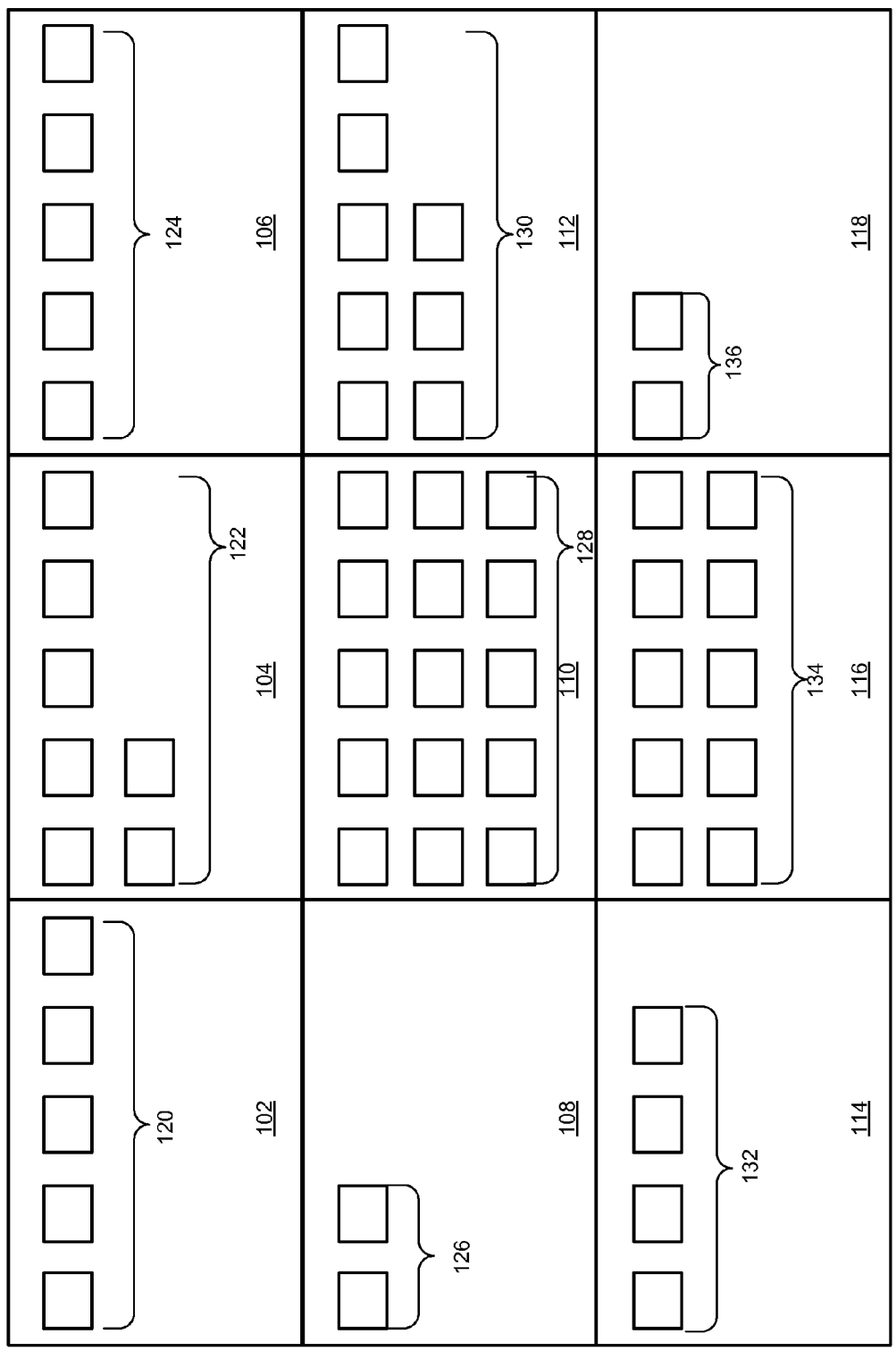
FIG. 1 illustrates an example grid-based visualization suitable for utilizing embodiments of the invention.

FIG. 1 illustrates an example grid-based visualization 100 suitable for utilizing embodiments of the invention. Example grid-based visualization 100 is partitioned into three rows and three columns, forming cells 102, 104, 106, 108, 110, 112, 114, 116, and 118; however, embodiments of the invention may be utilized with any arbitrary number of cells arranged into any possible combination of rows and columns.

Each of the cells 102-118 optionally contains a set of icons. For example, cells 102, 104, 106, 108, 110, 112, 114, 116, and 118 include icon sets 120, 122, 124, 126, 128, 130, 132, 134, and 136, respectively. Each of the icons represents a data entity, for example a record of an employee or product. Embodiments of the invention may be applied to data entities of any type, representing any type of physical or abstract entity that users may wish to compare or evaluate. Each cell may include zero or any arbitrary number of icons. Users may select, move, or otherwise interact with icons to reveal additional information and/or manipulate attributes of the corresponding data entity. Additionally, users may drag icons from one cell to another to change the corresponding data entity's attribute values to match those assigned to the destination cell.

In an embodiment, the horizontal and vertical axes of the grid-based visualization 100 are assigned to different attributes of the data entities, and each cell represents a pair or range of values for these two attributes. For example, the horizontal axis may be assigned to a product price attribute and the vertical axis may be assigned to a product performance attribute. In this example, each grid cell represents a specific pair of attribute values or a range of values for these two attributes. In another example, the horizontal and vertical axes may be assigned to employee performance and ability attributes, so as to help managers compare and visualize an organization's human resources.

In an embodiment, icons are dynamically sized such that each cell can display all of the icons matching that cell's attribute values and that each icon is as large as possible, so as to present as much information to the user as possible. However, if a cell's icon set is very large, this may result in very small icons that are difficult to read. Therefore, a further embodiment of the invention also limits the icons in a cell to a minimum icon size or larger. As discussed in detail below, embodiments of the invention may include selective zooming and overflow features to show large numbers of icons when there is insufficient room in a cell to display all of the icons in a set.

Figure 2A:
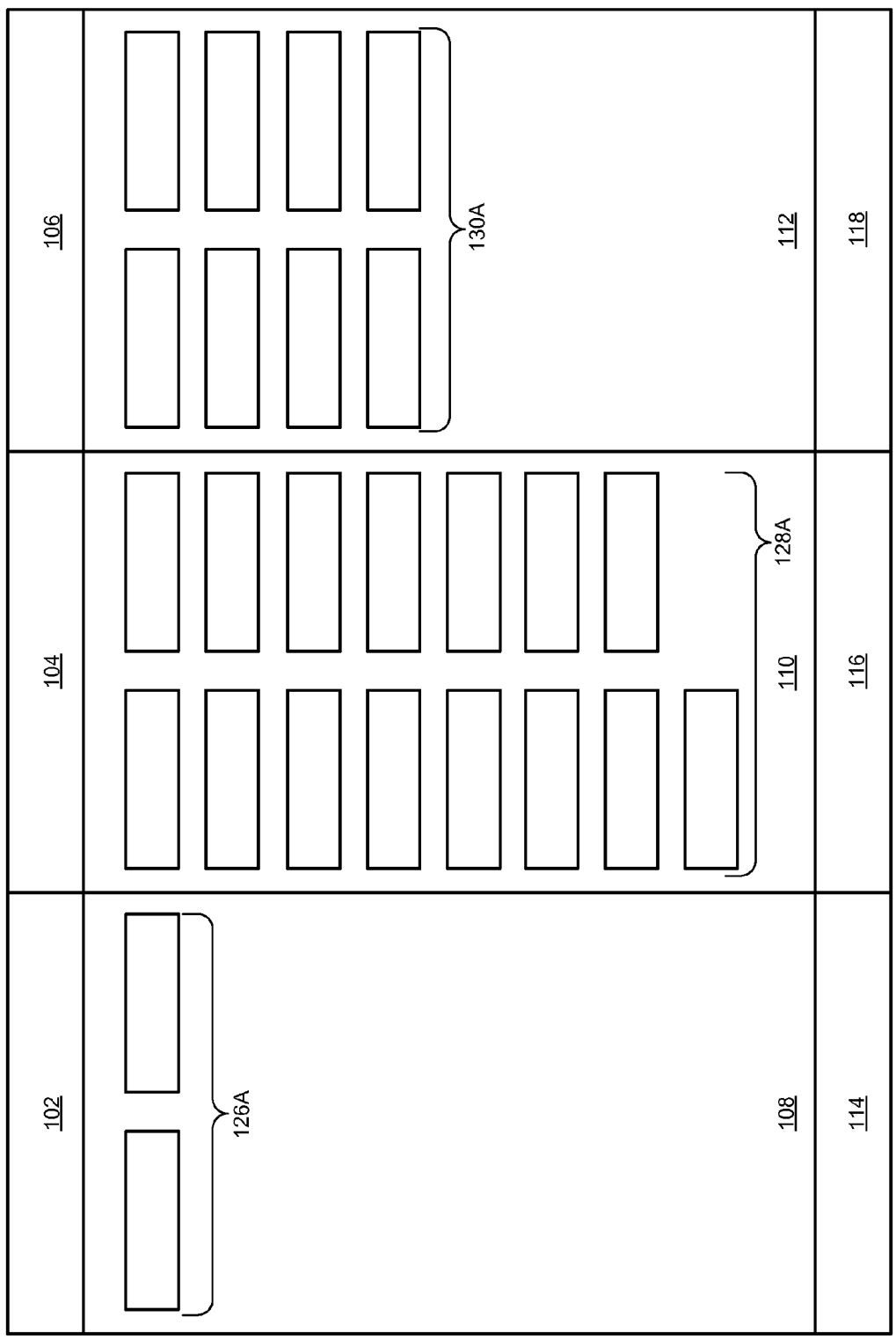
FIGS. 2A-2C illustrate examples of selective zooming on grid-based visualizations according to embodiments of the invention.
Figure 2B:
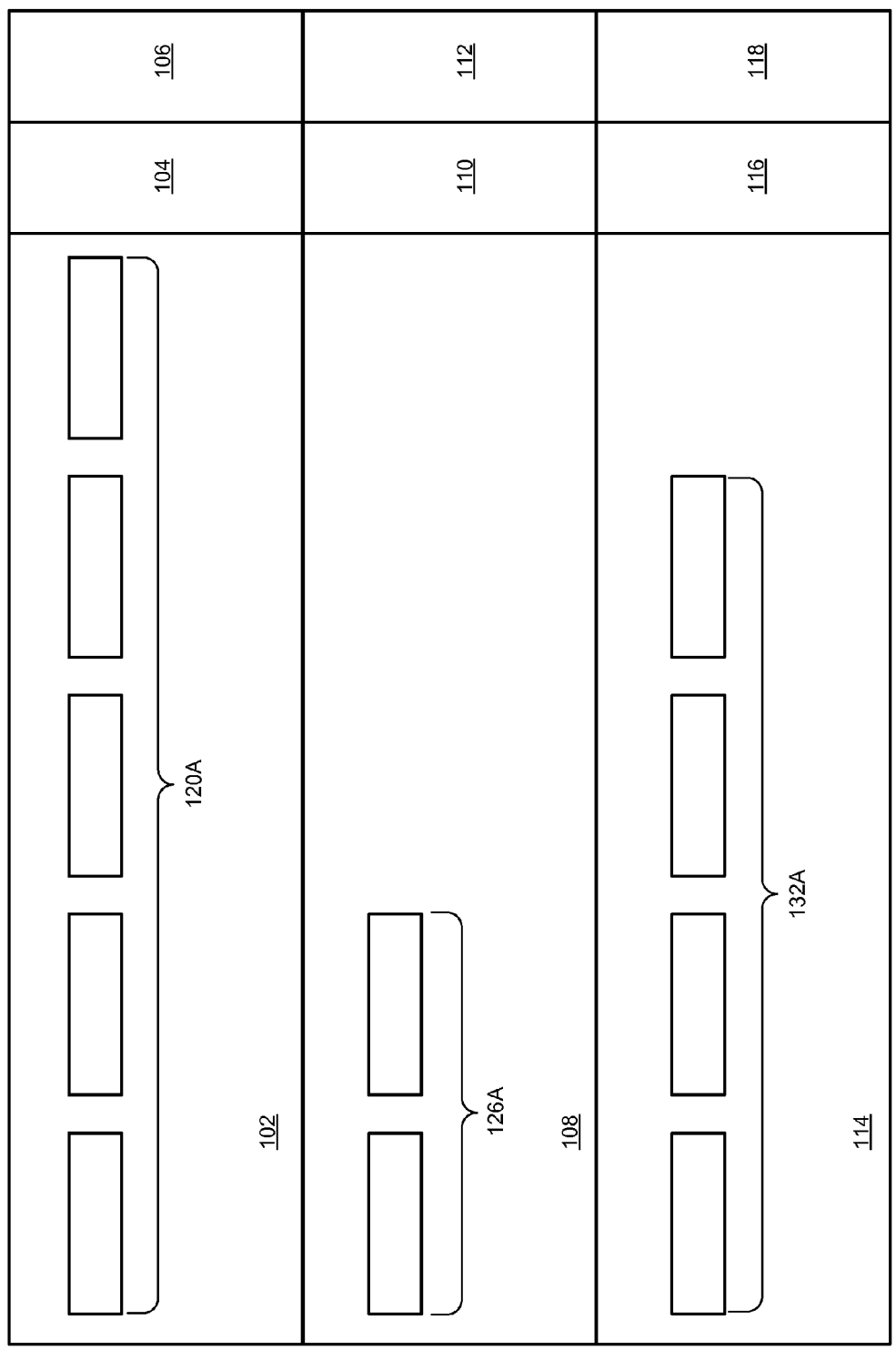
Figure 2C:
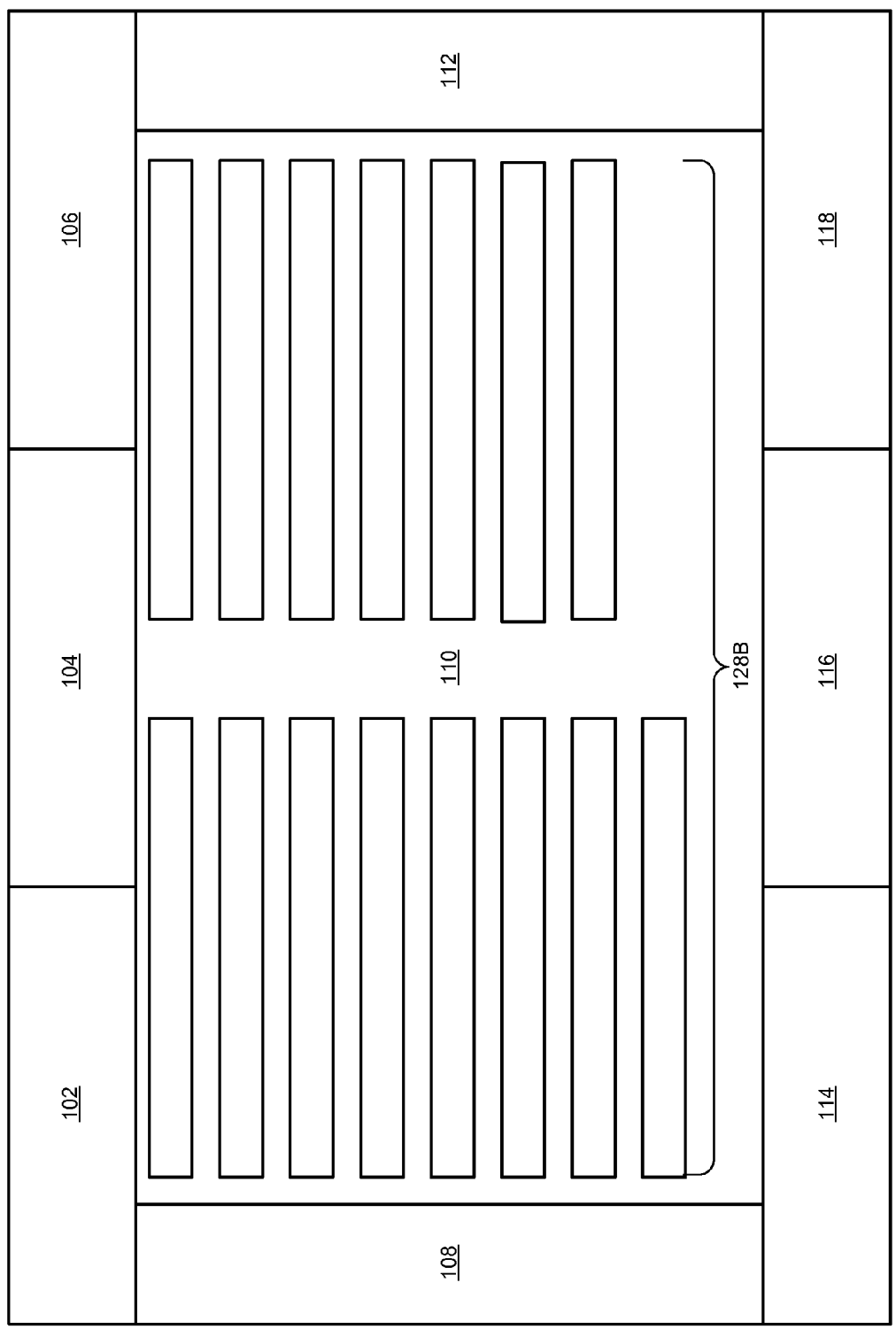

Embodiments of the invention include a selective zooming functionality for displaying more information per icon and/or more icons per cell in a grid-based visualization. FIGS. 2A-2C illustrate examples of selective zooming on grid-based visualizations according to embodiments of the invention. FIG. 2A illustrates an example row-based selective zoom on a grid-based visualization 200. A user selects a row of the grid-based visualization for zooming. In response, the icon sets in cells in the unselected rows are removed from view and all of the unselected rows are minimized. The selected row and its icon sets are enlarged to take the space left open by the minimized rows.

In this example, a user selects the center row for selective zooming. In response, the cells 102, 104, 106, 114, 116, and 118 are vertically minimized and their icon sets are removed. Cells 108, 110, and 112 in the selected row are enlarged, and the icons in their icon sets are enlarged to form icon sets 126A, 128A, and 130A, which are now large enough to convey additional information.

In an embodiment, the minimized cells remain visible in the selectively zoomed grid-based visualization 200 so as to provide context for the selected row's position with respect to the grid-based visualization as a whole. In a further embodiment, each of the minimized cells may include one or more summary icons or other indicators to provide aggregate information about the icon sets associated with minimized cells. For example, each minimized cell may include a summary icon indicating the number of icons in its icon set.

FIG. 2B illustrates an example column-based selective zoom on a grid-based visualization 230. A user selects a column of the grid-based visualization for zooming. In response, the icon sets in cells in the unselected columns are removed from view and all of the unselected columns are minimized. The selected column and its icon sets are enlarged to take the space left open by the minimized rows. In a further embodiment, cell labels may be rotated 90 degrees to more efficiently use the horizontal space.

In this example, a user selects the left column for selective zooming. In response, the cells 104, 106, 110, 112, 116, and 118 are horizontally minimized and their icon sets are removed. Cells 102, 108, and 114 in the selected column are enlarged, and the icons in their icon sets are enlarged to form icon sets 120A, 126A, and 132A, which are now large enough to convey additional information.

In an embodiment, the minimized cells remain visible in the selectively zoomed grid-based visualization 230 so as to provide context for the selected column's position with respect to the grid-based visualization as a whole. In a further embodiment, each of the minimized cells may include one or more summary icons or other indicators to provide aggregate information about the icon sets associated with minimized cells. For example, each minimized cell may include a summary icon indicating the number of icons in its icon set.

FIG. 2C illustrates an example cell-based selective zoom on a grid-based visualization 260. A user selects a cell of the grid-based visualization for zooming. In response, the icon sets in unselected cells are removed from view and the unselected cells are minimized. The selected cell and its icon set is enlarged to take the space left open by the other minimized cells.

In this example, a user selects the center cell 110 for selective zooming. In response, the cells 102, 104, 106, 108, 112, 114, 116, and 118 are horizontally or vertically minimized and their icon sets are removed. Selected cell 110 is enlarged, and the icons in its icon sets are enlarged to form enlarged icon set 128B, which are now large enough to convey additional information.

In an embodiment, the minimized cells remain visible in the selectively zoomed grid-based visualization 260 so as to provide context for the selected cell's position with respect to the grid-based visualization as a whole. In a further embodiment, each of the minimized cells may include one or more summary icons or other indicators to provide aggregate information about the icon sets associated with minimized cells. For example, each minimized cell may include a summary icon indicating the number of icons in its icon set.

Embodiments of the invention activate and deactivate the selective zooming on rows, columns, and/or individual cells via any type of user input, including graphical user interface buttons and mouse or touch inputs or gestures. For example, double-tapping on a specific row header, column header, or cell will initiate a selective zoom on the selected row, column, or cell, respectively. Additionally, embodiments of the invention may utilize animations and other visual effects, including scaling, panning, zooming, scrolling, cross-fades, and color changes, to emphasize aspects of the grid-based visualization when transitioning between the default and selective zoom views.

As shown in FIGS. 2A-2B, the selective zoom enlarges some of the icon sets to present additional information for the corresponding data items. Unfortunately, sometimes there are more icons in a data set than can be displayed in a cell of a grid-based visualization, especially if the icon size is restricted to a minimum icon size or larger. In these situations, embodiments of the invention may use an overflow indicator to indicate the existence of additional icons (and corresponding data items) associated with a cell of a grid-based visualization.

Figure 3:
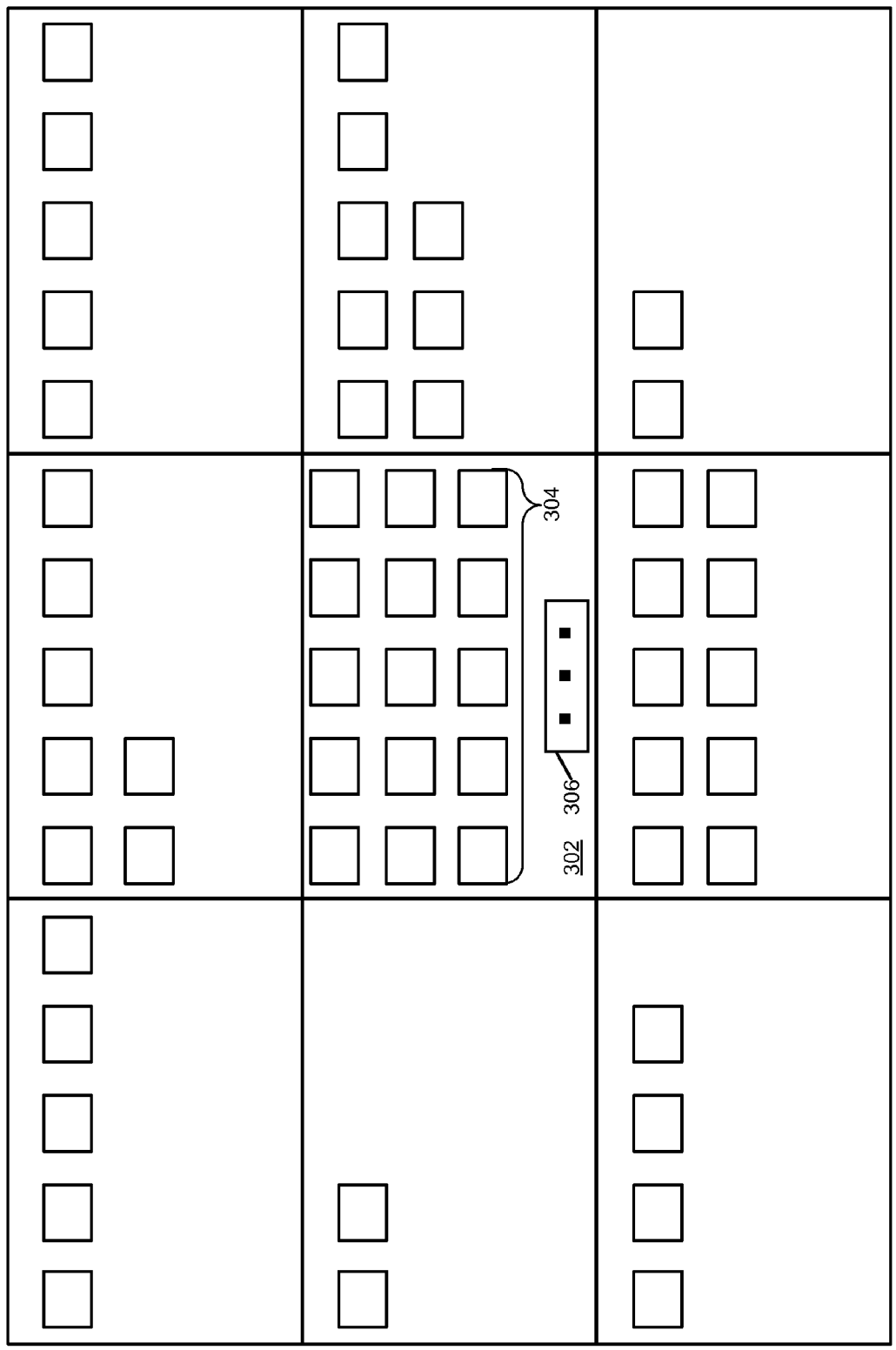
FIG. 3 illustrates an example overflow indicator in a grid-based visualization according to an embodiment of the invention.

FIG. 3 illustrates an example overflow indicator in a grid-based visualization 300 according to an embodiment of the invention. Example grid-based visualization 300 includes a cell 302 and visible icon set 304. In this example, there are more icons than can be displayed at one time in cell 302. Overflow indicator 306 indicates to users that there are additional icons in cell 302 that cannot be displayed within the space allocated. In response, a user may choose to activate the selective zoom of a cell, row, or column to increase the screen space allocated to cell 302. In an embodiment, when the selective zoom is activated on a cell, the icon sets are enlarged to a least a second minimum icon size, which is larger than the minimum icon size in the unzoomed view of the grid-based visualization. If there are still too many icons to fit in the zoomed cell, then a further embodiment of the invention may allow users to scroll the contents of the zoomed cell vertically and/or horizontally to view additional icons.

In a further embodiment, if the user has specified a search or filtering criteria, then icons matching the criteria will be arranged at the beginning of an icon set, so as to prioritize the visualization of icons relevant to the user's criteria.

Figure 4:
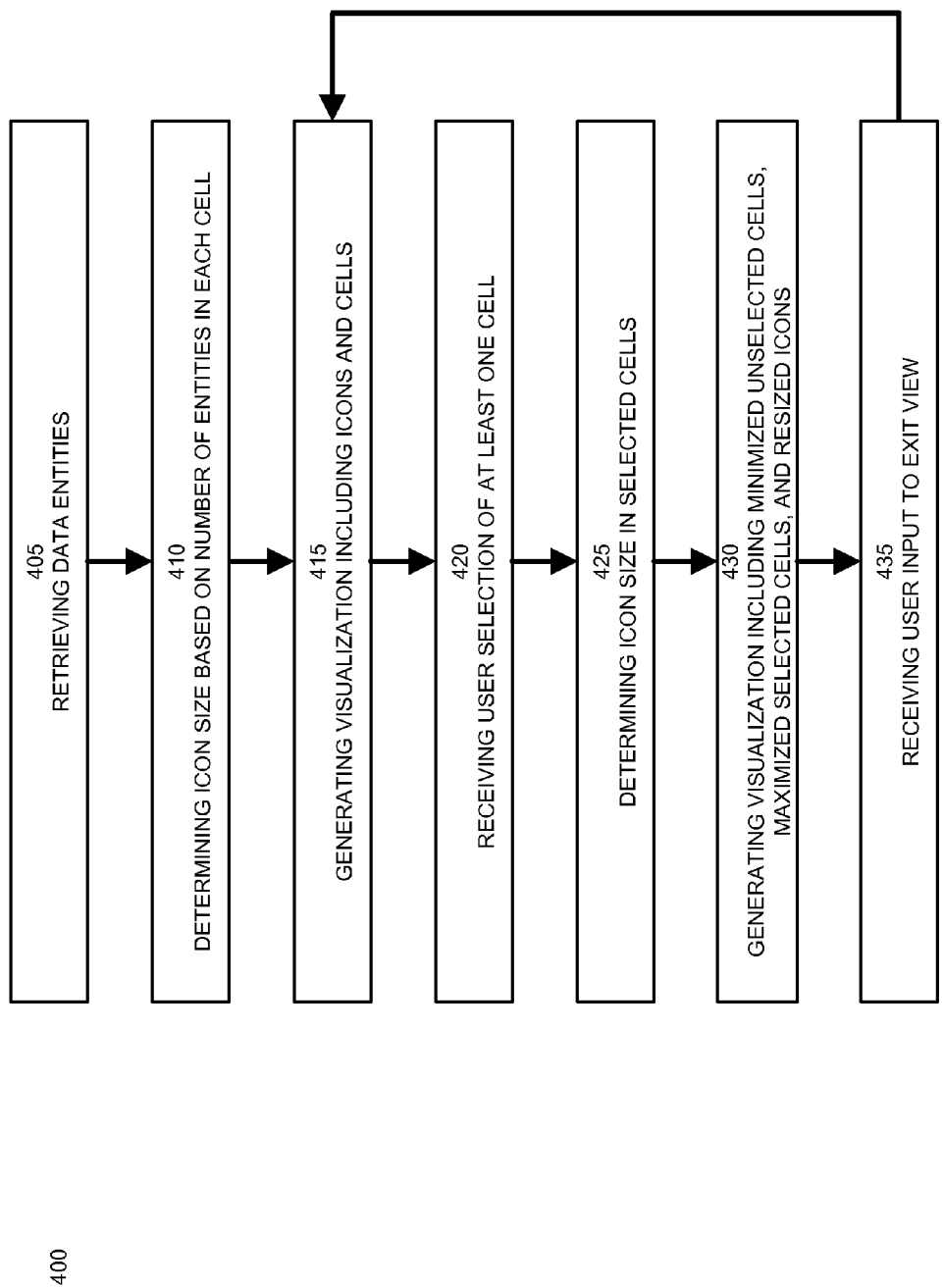
FIG. 4 illustrates a method of generating grid-based visualizations according to an embodiment of the invention.

FIG. 4 illustrates a method 400 of generating grid-based visualizations according to an embodiment of the invention. Step 405 retrieves one or more data entities to be displayed in a grid-based visualization. In an embodiment, step 405 retrieves data entities from a database or other data storage system. Step 405 may retrieve data entities matching criteria specified by a user and/or a visualization application. In one embodiment, step 405 retrieves data entities matching criteria for any cell in the grid-based visualization, and then assigns each data entity to a cell based on two or more data entity attribute values associated with the dimensions of the grid-based visualization. In another embodiment, step 405 retrieves data entities using criteria or database queries specific to each cell of the grid-based visualization.

Step 410 determines an icon size to represent each of the retrieved data entities. An embodiment of step 410 assumes that icons have a fixed height and variable icon width between a minimum and maximum value. This embodiment of step 410 lays out the icons in a grid layout within the cell bounds. The algorithm first calculates the maximum number of rows that will fit (maximumRows=floor(cellHeight/iconHeight)) and the maximum number of columns that will fit (maximumColumns=floor(cellWidth/minimumIconWidth)).

If maximumRows*maximumColumns is less than the number of icons assigned to a cell, an overflow is required and the iconWidth is set to cellWidth/maximumColumns. Otherwise, overflow is not required and an embodiment of the invention determines the largest iconWidth that will not trigger overflow. For example, this may be done by determining the optimal number of columns, starting by setting a variable testColumns to maximumColumns and decrementing from there. For each value of testColumns, if testColumns*maximumRows<iconCount, then overflow has occurred and the current value of testColumns+1 is the optimal number of columns. Alternatively, if cellWidth/testColumns>maximumIconWidth, the grid visualization can display all icons at their maximum width, so testColumns is the optimal number of columns. Then, the optimal icon width is cellWidth/optimalColumns. If after applying the above sizing algorithm, overflow still occurs, the last icon in the grid layout may be replaced with an interactive overflow indicator.

Step 415 generates a grid-based visualization including cells arranged in rows and columns and icon sets representing data entities. Step 415 may also generate other user interface elements, such as selective zoom controls, legends, and filter controls. In an embodiment, step 415 generates markup language code, styling elements, scripting code, data corresponding with attributes of the data entities, and any other content assets required to display and optionally enable user interaction with the grid-based visualization. This embodiment then forwards this generated code and data to a client application for processing to implement and display the grid-based visualization. In an example of this embodiment, the generated code and data may include web markup, code, and other content assets adapted to be displayed on a client web browser. In another embodiment, step 415 displays the grid-based visualization to users and implements the user interface.

Step 420 receives a user selection of at least one cell of the grid-based visualization for selective zooming. Embodiments of step 420 may receive a selection of a single cell, a row, a column, or any other arbitrary collection of cells in the grid-based visualization.

Step 425 then determines the icon size in the selectively zoomed cells. In an embodiment, icons are set to their maximum size in zoomed views because space is unlimited through the use of scrolling.

Step 430 generates the selectively zoomed grid-based visualization. In an embodiment, the unselected cells are set to a minimum height and/or width and their icon sets are removed from view. The one or more selected cells are enlarged to occupy the space vacated by the minimized unselected cells. The icons associated with selected cell(s) are enlarged to the size specified in step 425. In an embodiment, step 430 also adds or enables horizontal and/or vertical scrolling to selected cells to allow users to view and access the entire icon set associated with each cell, regardless of the number of icons and the icon size. In a further embodiment, step 430 specifies animation data for visually transitioning between the normal and selectively zoomed grid-based visualization.

In an embodiment, step 430 generates markup language code, styling elements, scripting code, data corresponding with attributes of the data entities, and any other content assets required to display and optionally enable user interaction with the grid-based visualization. This embodiment then forwards this generated code and data to a client application for processing to implement and display the grid-based visualization. In an example of this embodiment, the generated code and data may include web markup, code, and other content assets adapted to be displayed on a client web browser. In another embodiment, step 430 displays the grid-based visualization to users and implements the user interface.

Step 435 receives a user input indicating a desire to transition from the selectively zoomed grid-based visualization back to the unzoomed grid-based visualization. In response, method 400 returns to step 415 to generate a new view of the unzoomed grid-based visualization. In an embodiment, subsequent iterations of step 415 may generate animation data for visually transitioning between the selectively zoomed and normal grid-based visualization.

Figure 5A:
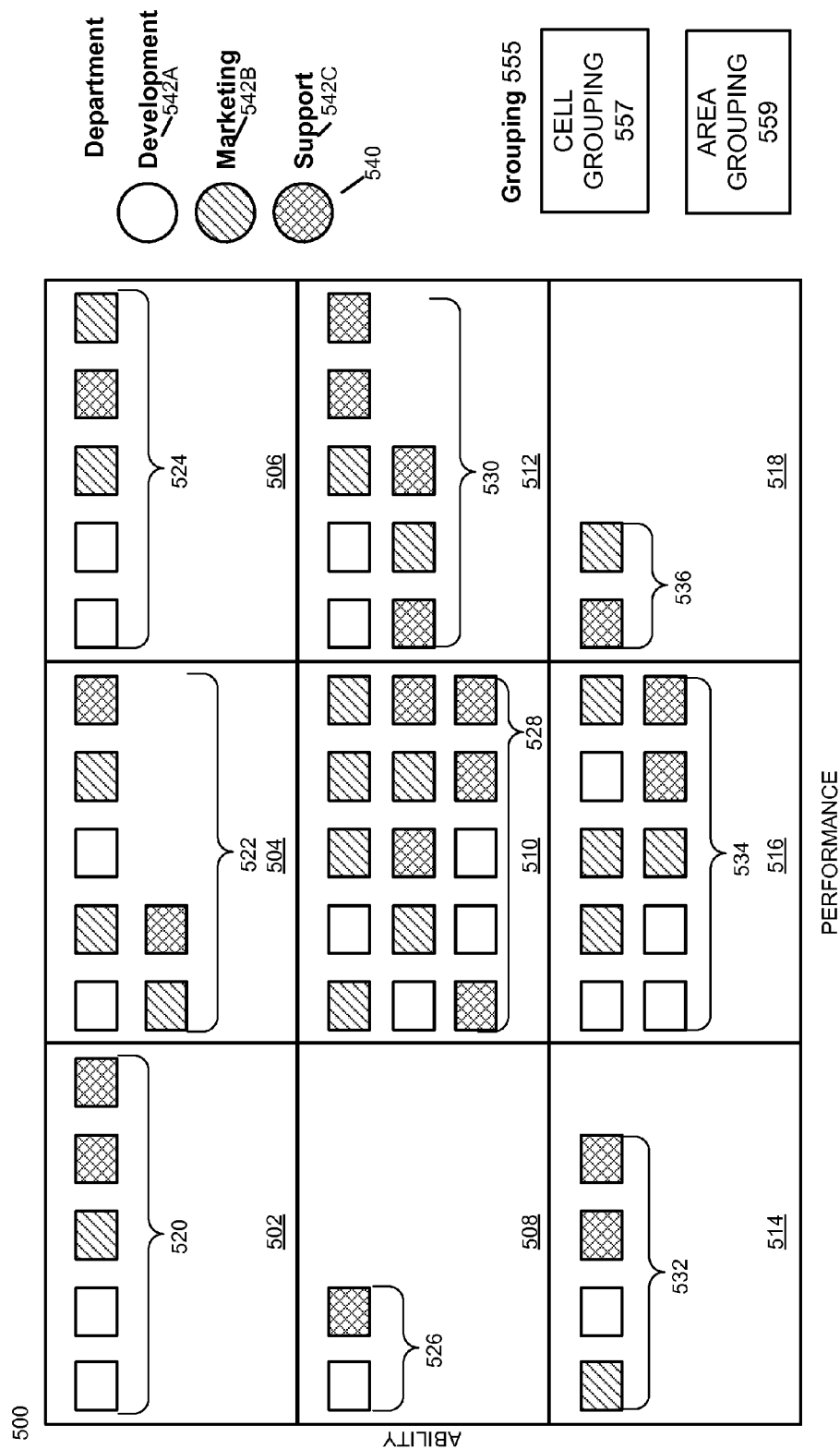
FIGS. 5A-5C illustrate example grouping functionality in grid-based visualizations according to embodiments of the invention.
Figure 5B:
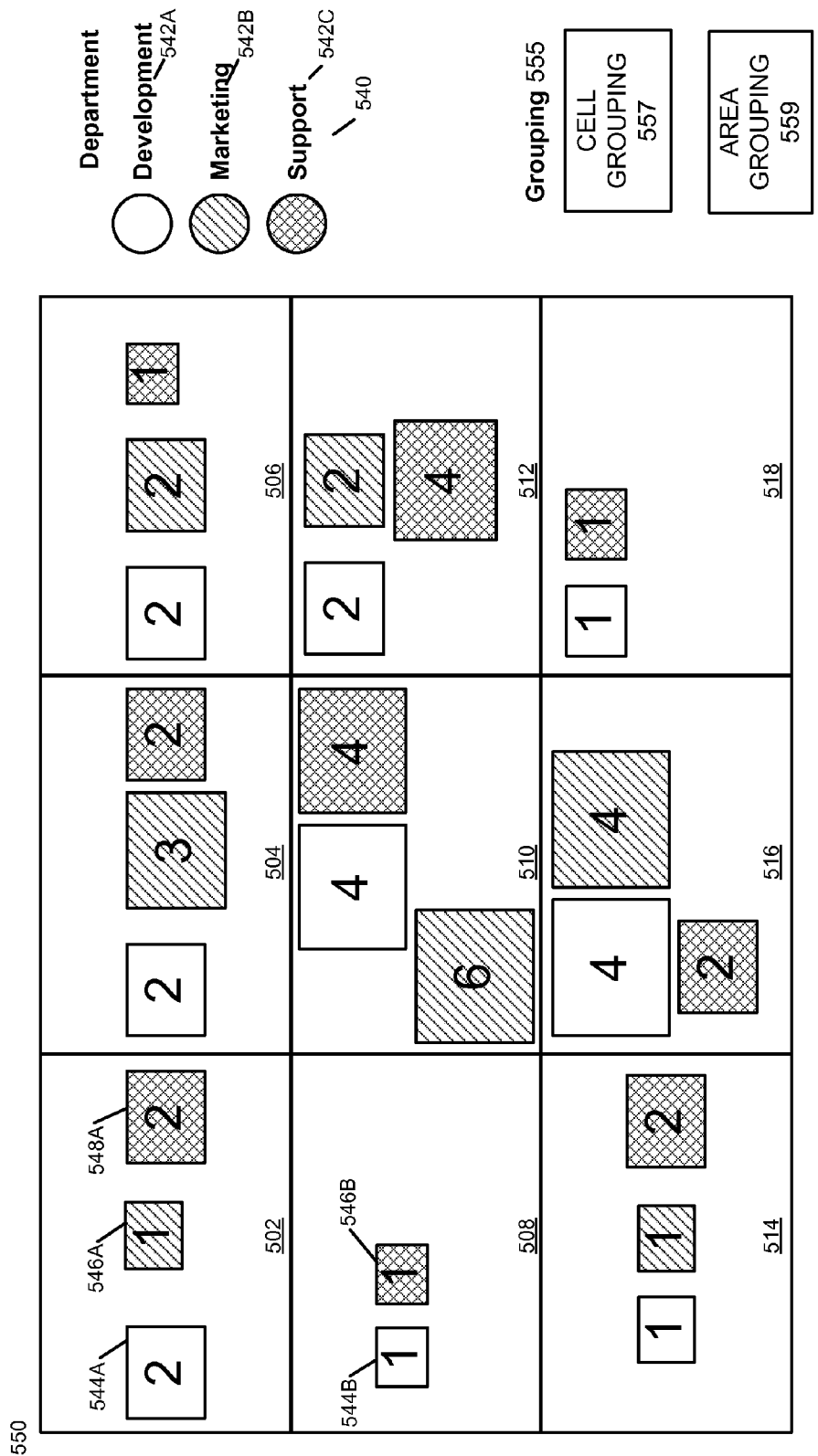
Figure 5C:
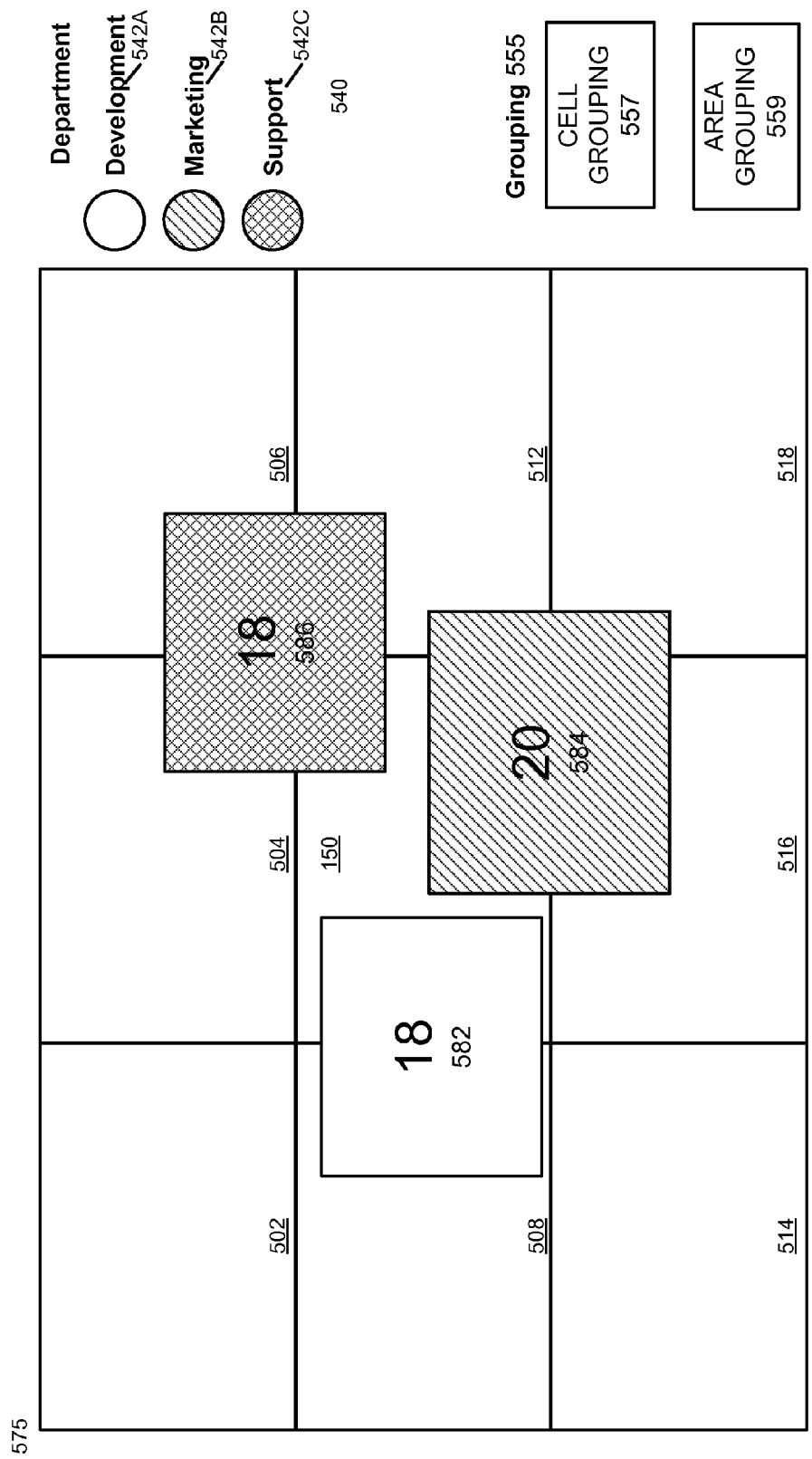

Embodiments of the invention also provide dynamic grouping functionality enabling users to group icons representing data entities in each cell or across multiple cells according to one or more additional attribute values. FIGS. 5A-5C illustrate example grouping functionality in grid-based visualizations according to embodiments of the invention.

FIG. 5A illustrates an example grid-based visualization 500 partitioned into three rows and three columns, forming cells 502, 504, 506, 508, 510, 512, 514, 516, and 518; however, embodiments of the invention may be utilized with any arbitrary number of cells arranged into any possible combination of rows and columns.

Each of the cells 502-518 optionally contains a set of icons, such as cells 502, 504, 506, 508, 510, 512, 514, 516, and 518 include icon sets 520, 522, 524, 526, 528, 530, 532, 534, and 536, respectively. Each of the icons represents a data entity, for example a record of an employee or product, and each cell may include zero or any arbitrary number of icons. Users may select, move, or otherwise interact with icons to reveal additional information and/or manipulate attributes of the corresponding data entity. Additionally, users may drag icons from one cell to another to change the corresponding data entity's attribute values to match those assigned to the destination cell.

In an embodiment, the horizontal and vertical axes of the grid-based visualization 500 are assigned to different attributes of the data entities, and each cell represents a pair or range of values for these two attributes. For example, the horizontal axis may be assigned to a measure of employee performance and the vertical axis may be assigned to a measure of employee ability. In this example, each grid cell represents a specific pair of attribute values or a range of values for these two attributes. In this example, each icon corresponds to a data entity representing an employee record. As described above, embodiments of the grid-based visualization 500 may dynamically size icons and include selecting zooming and overflow functions.

In addition to the two attributes assigned to the horizontal and vertical axes of the grid-based visualization, example grid-based visualization 500 also shades each icon according to one or more additional attribute values. For example, each icon is shaded, patterned, and/or colored based on the corresponding employee's department. A legend 540 includes entries 542A, 542B, and 542C indicating the color, pattern, and/or shading representing the Development, Marketing, and Support departments, respectively. Thus, in this example, the grid-based visualization 500 displays at least three attributes of the data entities: the performance, ability, and department of each employee.

Embodiments of the invention also include dynamic grouping functionality that enables users to group icons according to attribute values to view aggregate characteristics of the data set. FIG. 5B illustrates a first example grouping 550 applied to the example grid-based visualization 500 according to an embodiment of the invention. For each cell of the grid-based visualization, example grouping 550 replaces individual icons with summary icons. Each summary icon represents a unique tuple of attribute values. In this example grouping 550, each summary icon represents a tuple including the values of the two attribute dimensions of a cell as the employee department of one or more icons in that cell. Because there are three departments in the example grid-based visualization 500, the example grouping 550 may include up to three summary icons in each cell. In general, summary icons may be displayed for each combination of attribute values of the data entities displayed in a grid-based visualization.

Each summary icon may display one or more aggregate attributes of the group of icons it represents. In example grouping 550, for example, each summary icon displays the total number of icons (and hence data entities) that it represents. For example, cell 502 include two icons associated with the development department and one icon associated with the marketing department. Thus, in FIG. 5B, cell 502 in grouping 550 includes summary icon 544A shaded to indicate its association with the development department and including the numerical indicator "2." This indicates that summary icon 544A is a grouping of two development icons from the ungrouped grid-based visualization 500. Similarly, cell 502 also includes summary icons 546A and 548A, representing groupings of one marketing icon and two support icons from the ungrouped grid-based visualization 500, respectively. The other cells in the grouping 550 also include one or more summary icons, each one representing one or more icons from the ungrouped grid-based visualization 500 and displaying numerical indicators of their group size.

In a further embodiment, if there are no icons matching a given combination of tuple values for a cell, then the corresponding summary icon may be omitted from the grouping. For example, cell 508 in grouping 550 includes summary icons 544B and 548B, representing the development and support departments. However, cell 508 does not include a summary icon representing the marketing department, as there are no icons associated with that department in cell 508 in grid-based visualization 500.

In the example grouping 550, each cell includes summary icons representing the set of icons in that cell matching a given category (if any). In further embodiments of the invention, icons from two or more cells can be grouped under a single summary icon. For example, icons from the same row, column, the entire visualization, or any arbitrary selection of cells may be grouped under the same icons.

FIG. 5C illustrates a second example grouping 575 according to an embodiment of the invention. In this example grouping 575, icons associated with the same department and located in any of the cells are grouped under a single summary icon. Example grouping 575 includes summary icons 582, 584, and 586, representing icons from any cell associated with the development, marketing, and support departments, respectively.

In a further embodiment, summary icons may be positioned to provide additional information users. Example grouping 575 positions summary icons 582, 584, and 586 at positions based on a weighted average of the positions of the icons in that grouping.

Additional embodiments of the invention may visualize groupings of icons in the form of icons, symbols, text, numbers, images, charts (e.g. bar chart, pie chart, treemap), or any other type of visual indicator. In still other embodiments, the size of the summary icon is based on the number of icons it replaces.

Embodiments of the invention can enabling groupings of icons, such as grouping 550, using any type of user input and optionally any type of graphical user interface element. For example, grouping control 555 includes a button 557 for enabling and disabling grouping on a per cell basis, as shown in FIG. 5B, and a button 559 for enabling and disabling grouping across multiple cells, as shown in FIG. 5C.

In still a further embodiment, the legend 540 associated with grid-based visualization 500 is used as a graphical user interface control to enable groupings and optionally filter out categories of icons. For example, by selecting one or more of the categories 542A-542C in legend 540 in FIGS. 5A, 5B, or 5C, a user can add or remove all of the data entity icons or summary icons associated with that category.

FIGS. 5A-5C illustrate example groupings with respect to a single attribute value, in addition to the attributes associated with the grid-based visualization axes. However, embodiments of the invention may be applied to group icons according to multiple attributes.

Embodiments of example groupings 550 and 575 may also allow users to select any summary icon to view additional information about that group and/or the individual icons that it represents.

Figure 6:
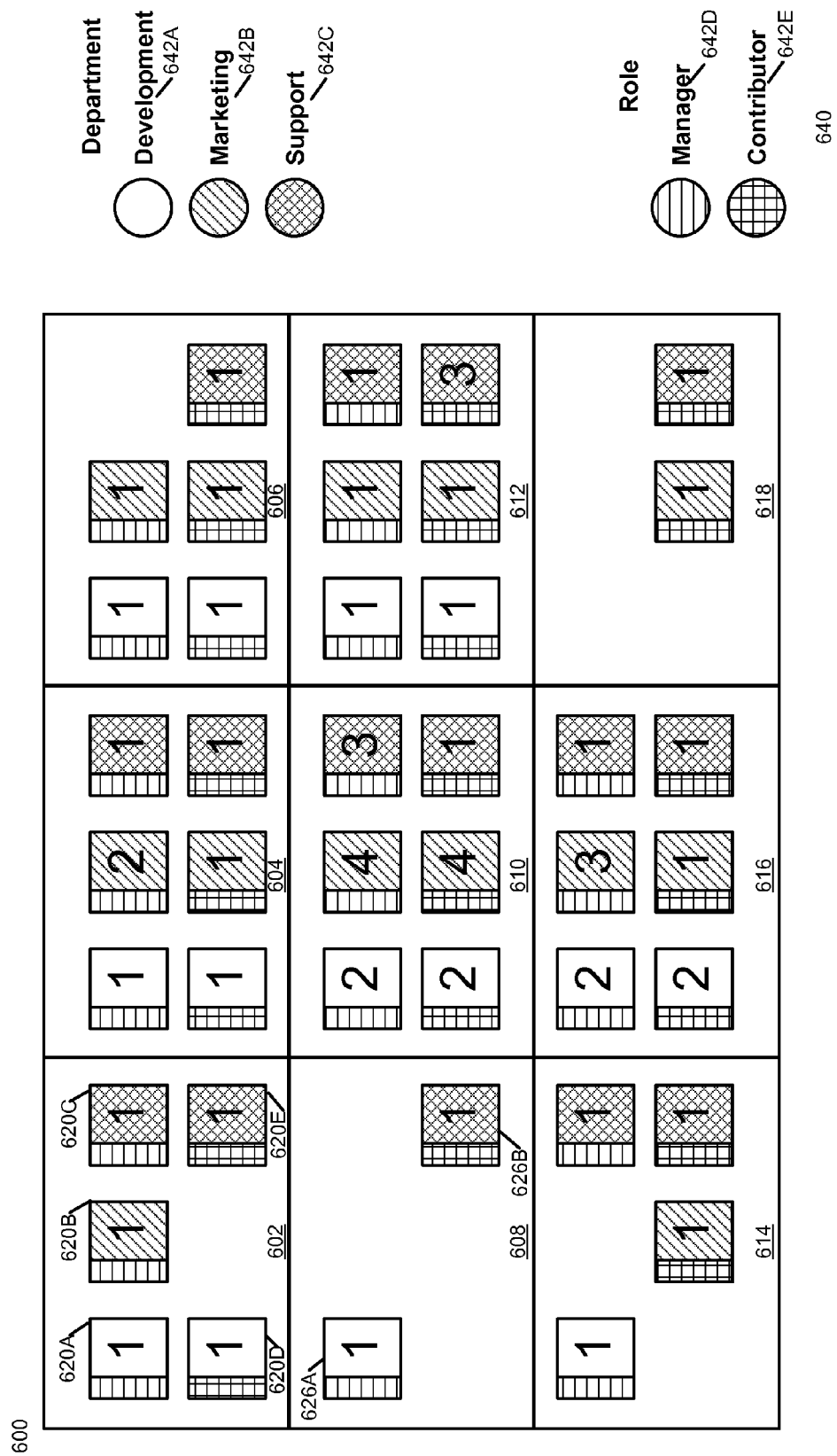
FIG. 6 illustrates an example multi-attribute grouping in a grid-based visualization according to an embodiment of the invention.

FIG. 6 illustrates an example multi-attribute grouping 600 in a grid-based visualization according to an embodiment of the invention. Example grouping 600 is a multi-attribute grouping of the grid-based visualization 500 in FIG. 5A. Example grouping 600 includes cells 602, 604, 606, 608, 610, 612, 614, 616, and 618. A legend 640 specifies the color, shading, and/or pattern applied to summary icons based on their values for two attributes: department and role. In example 600, the department attribute may have the value of development 642A, marketing 642B, or support 642C, and the role attribute may have the value of manager 642D or contributor 642E.

With these two attributes, each cell in example grouping 600 may have up to six summary icons, each representing one of the six possible combinations of these two attribute values. For example, cell 610 includes summary icons 628A-628F representing all possible value combinations of these two attributes. If there are no icons matching a given combination of tuple values for a cell, then the corresponding summary icon may be omitted from the grouping. For example, cell 608 in example grouping 600 includes only summary icons 626A and 626B, representing a development manager and a support contributor, as the corresponding ungrouped cell does not include any data entity icons having other combinations of attribute values.

In an embodiment, each summary icon is shaded in two or more sections to indicate its association with each category. Additional embodiments of the invention may visualize groupings of icons in the form of icons, symbols, text, numbers, images, charts (e.g. bar chart, pie chart, treemap), or any other type of visual indicator. In still other embodiments, the size of the summary icon is based on the number of icons it replaces.

As shown in example 600, embodiments of the multi-attribute grouping may be applied within each cell separately. Further embodiments of the invention may provide multi-attribute grouping across multiple cells, similar to that shown in FIG. 5C, except that each summary icon represents a group of icons with two or more attribute values in common. Embodiments of the multi-attribute grouping may also include any combination of the functions and interactions associated with other grid-based visualization discussed above, including drag-and-drop manipulation of data entity attributes via corresponding icons; user selection, movement, and other interactions to reveal additional information and/or manipulate attributes of the corresponding data entity; selective zooming on rows, columns, or one or more cells in the grid-based visualization; and dynamic icon sizing, overflow indicators, and/or scrolling within cells.

FIG. 7 illustrates a method 700 of grouping icons according to one or more attributes in a grid-based visualization according to an embodiment of the invention. Step 705 retrieves one or more data entities to be displayed in a grid-based visualization. In an embodiment, step 705 retrieves data entities from a database or other data storage system. Step 705 may retrieve data entities matching criteria specified by a user and/or a visualization application. In one embodiment, step 705 retrieves data entities matching criteria for any cell in the grid-based visualization, and then assigns each data entity to a cell based on two or more data entity attribute values associated with the dimensions of the grid-based visualization. In another embodiment, step 705 retrieves data entities using criteria or database queries specific to each cell of the grid-based visualization.

Step 710 generates a grid-based visualization including cells arranged in rows and columns and icon sets representing data entities. Step 710 may also generate other user interface elements, such as selective zoom controls, legends, and filter controls. In an embodiment, step 710 may specify the size of icons and their arrangement within cells in a manner similar to method 400 described above. In a further embodiment, step 710 assigns color, shading, patterns, and/or any other visual attributes to icons based on the value of one or more additional attributes.

In an embodiment, step 710 generates markup language code, styling elements, scripting code, data corresponding with attributes of the data entities, and any other content assets required to display and optionally enable user interaction with the grid-based visualization. This embodiment then forwards this generated code and data to a client application for processing to implement and display the grid-based visualization. In an example of this embodiment, the generated code and data may include web markup, code, and other content assets adapted to be displayed on a client web browser. In another embodiment, step 710 displays the grid-based visualization to users and implements the user interface.

Step 715 receives a user input activating a grouping with cells or across cells. In an embodiment of method 700, step 720 generates an identifier for each data entity based on one or more of its attribute values. Step 720 assigns data entities to groups based on their identifier values, and then determines any aggregate attribute values of the group, such as the number of data entities assigned to it. Step 720 determines the position, size, color, shading, patterning, and/or any other visual attributes of the summary icons based on the size of each group, the categories that they represent, and (depending on the type of grouping) the positions of the icons that they replace.

Step 725 then generates the visualization of the grouped icons. Step 725 may be performed in a manner similar to that described for step 710 above.

FIG. 8 illustrates a computer system suitable for implementing embodiments of the invention. Embodiments of the invention may be implemented as standalone applications or as web-based applications implemented using a combination of client-side and server-side code. The system includes user computers 1005 including desktop 1005A and portable personal computers 1005B, tablets 1005C, smartphones 1005D, and mobile phones 1005E. The system can interface with any type of electronic device, such as a thin-client computer, Internet-enabled mobile telephone, mobile Internet access device, tablet, electronic book, or personal digital assistant, capable of displaying and navigating web pages or other types of electronic documents and/or executing applications. Although the system 1000 is shown with five user computers, any number of user computers can be supported.

A web server 1010 is used to process requests from web browsers and standalone applications for web pages, electronic documents, enterprise data or other content, and other data from the user computers. The server may also provide push data or syndicated content, such as RSS feeds, of data related to enterprise operations.

Application server 1015 operates one or more applications. The applications can be implemented as one or more scripts or programs written in any programming language, such as Java, C, C++, C#, or any scripting language, such as JavaScript or ECMAScript, Perl, PHP, Python, Ruby, or TCL. Applications can be built using libraries or application frameworks, such as Rails, Enterprise JavaBeans, or .NET. Web content can created using HTML, CSS, and other web technology, including templating languages and parsers.

The data applications on application server 1015 process input data and user computer requests and can store or retrieve data from database 1020. Database 1020 stores data created and used by the data applications. In an embodiment, the database 1020 is a relational database that is adapted to store, update, and retrieve data in response to SQL format commands or other database query languages. In other embodiments, unstructured data storage architectures and NoSQL databases may also be used.

In an embodiment, the application server 1015 is one or more general-purpose computers capable of executing programs or scripts. In an embodiment, the web server 1010 is implemented as an application running on one or more general-purpose computers. The web server and application server may be combined and executed on the same computers.

An electronic communication network 1025 enables communication between user computers 1005, web server 1010, application server 1015, and database 1020. In an embodiment, network 1025 may further include any form of electrical or optical communication devices, including wireless 1025A and wired 1025B networks. Network 1025 may also incorporate one or more local-area networks, such as an Ethernet network; wide-area networks, such as the Internet and cellular carrier data networks; and virtual networks, such as a virtual private network.

The system is one example for executing applications according to an embodiment of the invention. In another embodiment, application server, web server, and optionally database can be combined into a single server computer application and system. In a further embodiment, virtualization and virtual machine applications may be used to implement one or more of the application server, web server, and database. In still further embodiments, all or a portion of the web server and application functions may be integrated into an application running on each of the user computers. For example, a JavaScript application on the user computer may be used to retrieve or analyze data and display portions of the applications.

Although the description has been described with respect to particular embodiments thereof, these particular embodiments are merely illustrative, and not restrictive. Any suitable programming language can be used to implement the routines of particular embodiments. Any type of programming techniques may be employed including procedural, functional, and/or object oriented programming techniques. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a tangible computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method for manipulating a data visualization in a computing system including a processor coupled to a user input and to a display, the method comprising the following operations performed by the processor:
    displaying a grid visualization including grid cells, wherein at least a first grid cell is associated with first icons and displays a first view of the first icons and a second grid cell is associated with second icons and displays a first view of the second icons, and wherein the first view of the first and second icons includes the first and second icons having a first size;
    receiving a user input selecting a portion of the grid visualization including at least the first grid cell and the second grid cell;
    reducing in size along at least one dimension an unselected portion of the grid visualization;
    increasing in size along the at least one dimension the selected portion of the grid visualization; and
    displaying a second view of the first icons and of the second icons, wherein the second view of the icons includes the icons having a second size larger than the first size, and wherein the second size is as large as possible for displaying all first icons in the first grid cell and all second icons in the second grid cell.

2. The method of claim 1, wherein the second view of the icons displays additional data within the icons, wherein the additional data is absent in the first view of the icons.

3. The method of claim 2, wherein the icons include icons, text entities, numbers, images, symbols, charts, or other visual information.

4. The method of claim 1, wherein the selected portion of the grid visualization includes a grid row including the first grid cell.

5. The method of claim 1, wherein the selected portion of the grid visualization includes a grid column including the first grid cell.

6. The method of claim 1, wherein the selected portion of the grid visualization includes only the first grid cell.

7. The method of claim 1, wherein the first view of the icons includes a subset of the icons associated with the first grid cell and the second view of the icons includes all of the icons associated with the first grid cell.

8. The method of claim 7, wherein the second view of the icons includes a scrolling function to display all of the icons associated with the first grid cell.

9. The method of claim 1, wherein the grid visualization includes a third grid cell associated with third icons, the method comprising:
    removing the third icons in response to the selection of the first and second grid cells and not the third grid cell; and
    reducing in size along at least one dimension an unselected portion of the grid visualization includes reducing in size the third grid cell.

10. The method of claim 9, wherein reducing in size the third grid cell includes adding a summary icon representing the third icons to the third grid cell.

11. A tangible, non-transitory computer-readable data storage medium including instructions adapted to direct a processor to perform an operation, the operation comprising:
    retrieving data entities from a data storage;
    generating for display a grid visualization including grid cells arranged in first and second dimensions corresponding with first and second data entity attributes;
    arranging for display icons representing the data entities in the grid cells based on their values for the first and second data entity attributes;
    receiving a user input selecting a portion of the grid visualization including at least a first one and a second one of the grid cells;
    reducing in size along at least one of the first and second dimensions an unselected portion of the grid visualization including at least a second one of the grid cells;
    increasing in size along the at least one of the first and second dimensions the first one of the grid cells in the selected portion of the grid visualization; and
    displaying an alternate view of a portion of the icons included in the first one and the second one of the grid cells, wherein a size of icons in the alternate view is as large as possible for displaying all icons in the first one and the second one of the grid cells.

* * * * *